(12) United States Patent
Combrink

(10) Patent No.: US 7,866,353 B2
(45) Date of Patent: Jan. 11, 2011

(54) METHOD AND APPARATUS FOR FILLING OPEN CONTAINERS WITH A POWDERY PRODUCT

(75) Inventor: Alois Combrink, Oelde (DE)

(73) Assignee: Haver & Boecker oHG, Oelde (DE)

( * ) Notice: Subject to any disclaimer, the term of this patent is extended or adjusted under 35 U.S.C. 154(b) by 1077 days.

(21) Appl. No.: 11/568,833

(22) PCT Filed: May 6, 2005

(86) PCT No.: PCT/EP2005/004930

§ 371 (c)(1),
(2), (4) Date: Nov. 8, 2006

(87) PCT Pub. No.: WO2005/110849

PCT Pub. Date: Nov. 24, 2005

(65) Prior Publication Data

US 2008/0257450 A1    Oct. 23, 2008

(30) Foreign Application Priority Data

May 14, 2004 (DE) ......................... 10 2004 024 476
Jul. 30, 2004 (DE) ......................... 10 2004 037 107

(51) Int. Cl.
    *B65B 1/04* (2006.01)
(52) U.S. Cl. .................... 141/12; 141/10; 141/83; 141/102; 141/106; 53/525
(58) Field of Classification Search ............. 141/10, 141/11, 12, 71–75, 80, 83, 102, 105, 106; 53/469, 523, 525, 529; 177/116–118
See application file for complete search history.

(56) References Cited

U.S. PATENT DOCUMENTS

| 3,209,844 | A |   | 10/1965 | Stambera et al. |        |
|-----------|---|---|---------|-----------------|--------|
| 3,404,742 | A |   | 10/1968 | Bonneric        |        |
| 3,589,411 | A |   | 6/1971  | Vogt            |        |
| 4,275,775 | A |   | 6/1981  | Egli            |        |
| 5,109,893 | A | * | 5/1992  | Derby           | 141/67 |
| 5,168,906 | A | * | 12/1992 | Combrink        | 141/10 |
| 5,244,019 | A | * | 9/1993  | Derby           | 141/65 |
| 5,749,401 | A | * | 5/1998  | Shinya et al.   | 141/80 |
| 5,753,868 | A | * | 5/1998  | Diem            | 177/70 |
| 5,979,512 | A | * | 11/1999 | McGregor et al. | 141/83 |

(Continued)

FOREIGN PATENT DOCUMENTS

CH       611 216 A       5/1979

(Continued)

*Primary Examiner*—Gregory L Huson
*Assistant Examiner*—Nicolas A Arnett
(74) *Attorney, Agent, or Firm*—Henry M. Feiereisen; Ursula B. Day

(57) ABSTRACT

Apparatus and method for filling a container (7), particularly an open bag, with a powdery product has the following features" a net scale (1) situated above a tube arrangement and/or hopper arrangement (2), which terminates in a filler neck (6) above the container (7) to be filled while preferably projecting into this container. An intermediate chamber (3) is arranged downstream of the net scale and upstream of the container (7) to temporarily hold at least a portion of the product released by the net scale, and a compacting device (8, 9) is provided for compacting the product placed inside the container (7).

8 Claims, 3 Drawing Sheets

U.S. PATENT DOCUMENTS 6,295,790 B1 * 10/2001 McGregor et al. ......... 53/374.3
7,356,980 B2 * 4/2008 Sus et al. ...................... 53/475

FOREIGN PATENT DOCUMENTS

| | | |
|---|---|---|
| CH | 683 251 A5 | 2/1994 |
| DE | 36 40 520 A1 | 6/1988 |
| DE | 38 11 880 A1 | 10/1989 |
| DE | 101 32 715 C | 1/2003 |
| GB | 661 224 A | 11/1951 |
| GB | 1 011 653 A | 12/1965 |

* cited by examiner a)

b)

a)

b)

METHOD AND APPARATUS FOR FILLING OPEN CONTAINERS WITH A POWDERY PRODUCT

BACKGROUND OF THE INVENTION

The invention relates to an apparatus and a method for filling an open container, preferably an open bag.

In order to accurately weigh a product, it is common to split the product flow into a coarse stream and a fine stream. A worm may hereby be used for example as dosing member. This type of product feed is provided exclusively for realizing a high weight accuracy.

The net system involves in some cases a separation of the product flow into fine and coarse streams when being filled into the scale, whereas the gross system involves a separation during filling the container.

In general, the gross system provides only little productivity which is disadvantageous. At the same time, there is no possibility to compact the product during the weighing phase because any type of manipulation has an impact on a weight.

Gross systems are also known which provide an intermediate compaction at a non-critical weighing moment during the weighing and filling processes.

Cited as prior art are U.S. Pat. No. 3,209,844 A, DE 36 40 520 A1, U.S. Pat. No. 3,404,742 A, CH 683 251 A5, DE 38 11 880 A1, U.S. Pat. No. 3,589,411 A, GB 1 011 653 A, DE 101 32 715 C1, CH 611 216 A5, U.S. Pat. No. 4,275,775A, and GB 661 224 A.

U.S. Pat. No. 3,209,844 describes a filling device with a scale by which a coarse weight is pre-metered (underweight) which is then fully emptied into the filling container. Subsequently, a volume dosing wheel supplies a fine stream.

DE 36 40 520 describes a filling device to first weigh the quantity to be filled and then to discharge it directly into a bag.

U.S. Pat. No. 3,404,742 describes a weighing device by which a coarse stream of the filling material is volumetrically pre-metered and released in a scale receiver. Doses of the fine stream are then added. Subsequently, the total filling material portion is dispensed.

CH 683 251 A5 uses a differential scale as weighing device and dispenses the released product directly from the scale as coarse and fine streams.

DE 38 11 880 A1 deals with the problem of maintaining the filling material continuously under vacuum during an otherwise known filling procedure in order to prevent contamination as a result of environmental impacts.

U.S. Pat. No. 3,589,411 describes a filling apparatus having two separate connections into a bag to be filled. Each of the connections has its own weighing mechanism for alternatingly weighing the material. A feeder with an impeller that rotates at constant revolution compacts the product so that the material to be filled drops pre-compacted in accordance with the revolving compartments into a filling container. The impeller thus assumes the function of ventilation and compaction of the filling material. (Continuous transport as a result of product compaction).

All afore-mentioned apparatuses lack basically apparatuses for product compaction or are dimensioned for only little output.

Powdery products which are also very fine have the characteristic of intake of air during transport and also during the filling operation, leading to a significant increase in volume. As a consequence, the bags normally used for packaging must have a respectively great volume to provide enough space for the product in the bags.

After the product has again released the air entirely or partly following the filling of the bags, for example through introducing compaction measures or after elapse of a certain time, the product takes up a respectively smaller volume, so that the bag or the bag article becomes too big, i.e. packaging material is given away, resulting in higher costs and problems when stacking the bags. The afore-mentioned prior art is unsuitable to overcome these problems satisfactorily.

SUMMARY OF THE INVENTION

The invention is thus based on the object to provide a method and apparatus for filling containers with a powdery product, by which the afore-described problem is overcome in a simple manner.

According to one aspect of the invention, an apparatus for filling an open-topped container, preferably an open bag, with a powdery product, includes a net scale above a tube arrangement and/or hopper arrangement, which terminates in a filling neck arranged above the container to be filled and preferably projects into the container, an intermediate chamber disposed downstream of the net scale and upstream of the container for temporarily holding at least a portion of the product released from the net scale, and a compaction device for compacting the product filled into the container.

With respect to the method, a weighed quantity—i.e. net process—of the product is emptied from the net scale via the tube arrangement and/or hopper arrangement into the container, with part of the product temporarily received in an intermediate chamber before being transferred into the container.

As the invention utilizes the net weighing principle which is known per se and involves an initial weighing of the total filling material portion before being filled, a high output can initially be realized because the next portion can be weighed during the actual filling and compaction operation.

As the total volume flow is not immediately transferred into the container, the container is not overfilled despite the application of the net principle. This type of after-dosing following the weighing process with a net system is known from the prior art. Thereafter, after-dosing takes place, preferably accompanied by a compaction of the product in the container or bag. The bag can thus be sized fairly small.

Particular advantages of this procedure are:
1. A high productivity of the apparatus because the net scale is able to empty the product in one working step;
2. A high compaction speed because the first product shot can be quickly introduced and a max. filling degree of the bag is ensured so that the compaction success is optimal;
3. A proportional addition of the product as a result of the compaction effect in the absence of overfilling of the container.

The remaining product flows suitably past the intermediate chamber and is transferred directly into the container, with the ratio of the split between the intermediate chamber and the remaining product directly introduced into the container being so selected as to sufficiently fill the bag without encountering overfilling of the bag.

Preferably, the product introduced into the container is compacted by means of a compaction device and the remaining product is after-dosed from the intermediate chamber during the initiated compaction process by means of the compaction device and the accompanying reduction in volume.

The method according to the invention is suitable in particular also for the application of a rotating filling machine where the upstream net scales are arranged stationarily. In particular when such a construction is involved, the step-by-step feed of material would be possible at all only by increasing the complexity of the technical implementation and accepting a high power loss.

Powdery product enriched with air has extremely high flow capability and its flow behavior can indeed be compared with that of water. In other words, the bag has to be very well sealed to the neck to prevent product from escaping to the outside and causing contamination of the bags and the installation.

These sealing measures although also being a component of the machine are subject to wear. Furthermore, the quality of the seal is also dependent on the composition of the bag material (folding).

As in accordance with the invention the fill level is always below the danger zone, the afore-described problems are no longer an issue. As a result, the operation of the apparatus is safe.

Advantageously, channels are arranged in the filling neck for carrying away displaced air and thus preventing excess pressure in the bag. This function is no longer possible, when the fill level rises to a height that causes these channels to close. At the same time, there is the risk that the product settles in these channels and escapes after removing the bag and causing contamination of the installation and the bags.

A further important aspect during filling of bags is the demand for high cleanliness of the later closure zone of the bag. This becomes even more important when the closure is realized through welding that requires high cleanliness of the foil inner side. The afore-described method has proven its effectiveness especially when it comes to solving this problem while still achieving high filling speeds.

According to a variation, in which the intermediate chamber is constructed over the entire hopper cross section and thus able to hold the entire material amount, the dosing member initially is set for a high mass flow.

Especially preferred is a control or regulation of the mass flow by the dosing member in such a manner as to prevent a bridge formation of the neck as a result of material backup.

According to a further improvement, the dosing member controls or regulates the passing mass flow after the rapid filling action in such a manner as to prevent overfilling of the container during compaction of the material in the container.

BRIEF DESCRIPTION OF THE DRAWING

Preferred exemplified embodiments of the invention will now be described in more detail with reference to the drawing, in which.

DETAILED DESCRIPTION OF PREFERRED EMBODIMENTS

Figure 1:
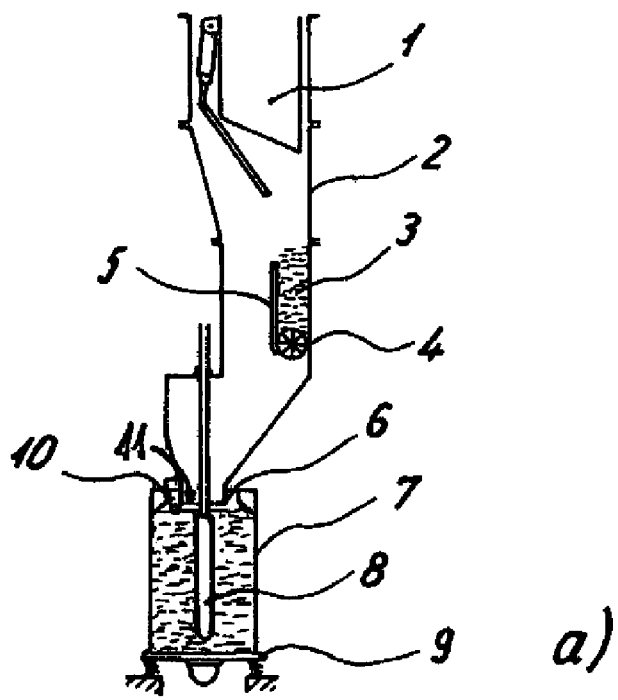
FIGS. 1a, b show a schematic illustration of a first apparatus according to the invention for filling a container in two successive steps during filling of the container by means of after-dosing with a rotary feeder.
Figure 1:
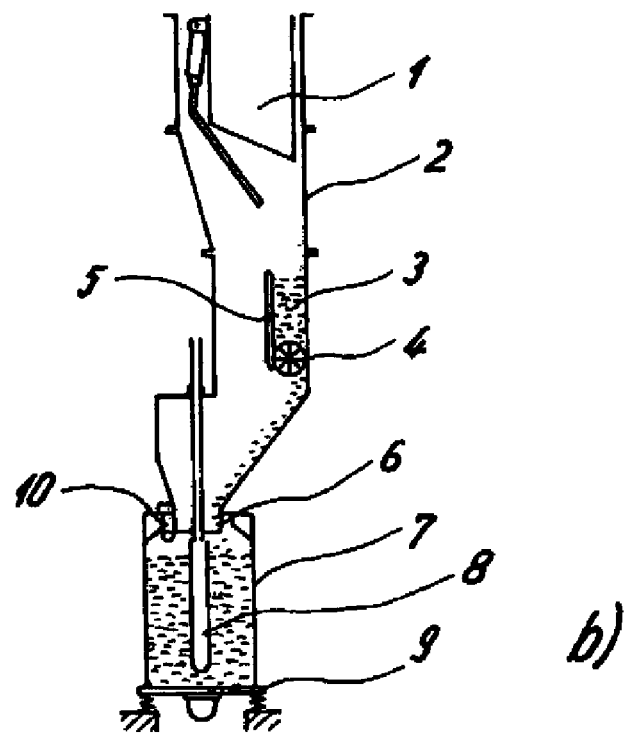

FIGS. 1a, b show an apparatus for filling a container 7—an open bag—with a net scale 1, which is arranged above a tube arrangement and/or hopper arrangement 2 which terminates in a neck 6 from which a container 7—especially an open bag—is suspended.

The so-called net principle is used as weighing process, i.e. the net scale 1 weighs the product being filled portion-by-portion—e.g. in amounts of 25 kg—and then releases the thus weighed portions via the tube/hopper arrangement 2 and the neck 6 into the container 7. This operation provides the benefit of a particularly high productivity in comparison to the gross system.

In order to avoid hereby the detrimental effect of overfilling the container 7, the product stream or at least part thereof is transferred into an intermediate chamber 3 which is arranged in the tube arrangement and/or hopper arrangement 2. This intermediate chamber 3 receives (depending on the air content of the product) a portion of the product released by the net scale—preferably about 20-50%, in particular about ⅓ of the product.

The remaining product flows past the intermediate chamber 3, which does not cover the entire cross section of the tube/hopper arrangement 2, and is directly introduced into the container 7. The ratio of the split of the product between the intermediate chamber 3 and the portion directly introduced into the container is hereby selected such that no overfilling of the bag can be experienced (FIG. 1a, FIG. 2a).

Projecting into the container 7 is e.g. a compaction device 8 from its open-topped side, or a differently arranged compaction device 9, which is constructed to so compact the product introduced into the container 7 as to liberate a portion of the absorbed air.

During the now commencing compaction operation by means of the compaction device 8/9 and the accompanying reduction in volume of the product, the remaining material is dosed from the intermediate chamber 3 in such a manner that the compaction speed and the volume flow with which the container can be filled, correspond. As a result, maximum compaction speed is ensured, without encountering overfilling (FIGS. 1b, 2b).

The compaction device can be implemented in any manner suitable, for example as a type of probe (reference sign 8, causing vibrations for example, or a vacuum lance etc.) and/or with the aid of a shaking arrangement, e.g. with the aid of a vibrating table (cf. 9) upon which the container is placed.

Figure 2:
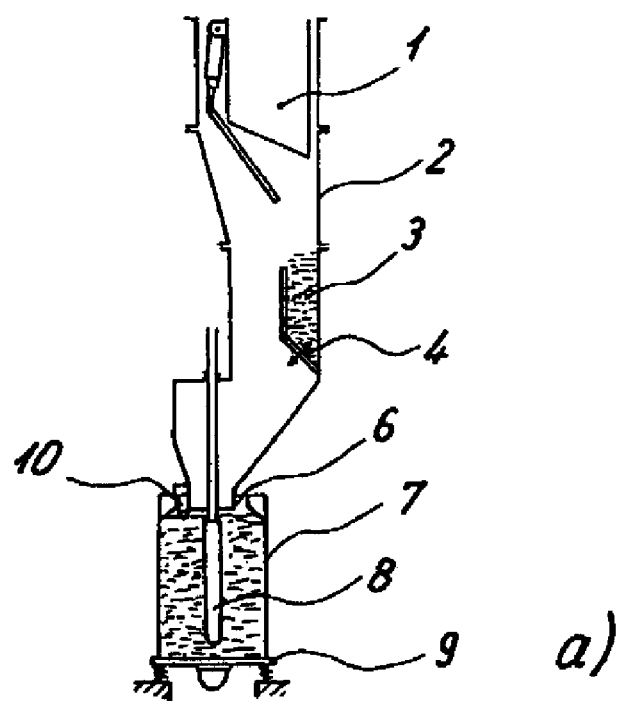
FIGS. 2a, b show a schematic illustration of a further apparatus for filling a container in two successive steps after and during filling of the container by means of after-dosing with a random dosing member, here a gate.
Figure 2:
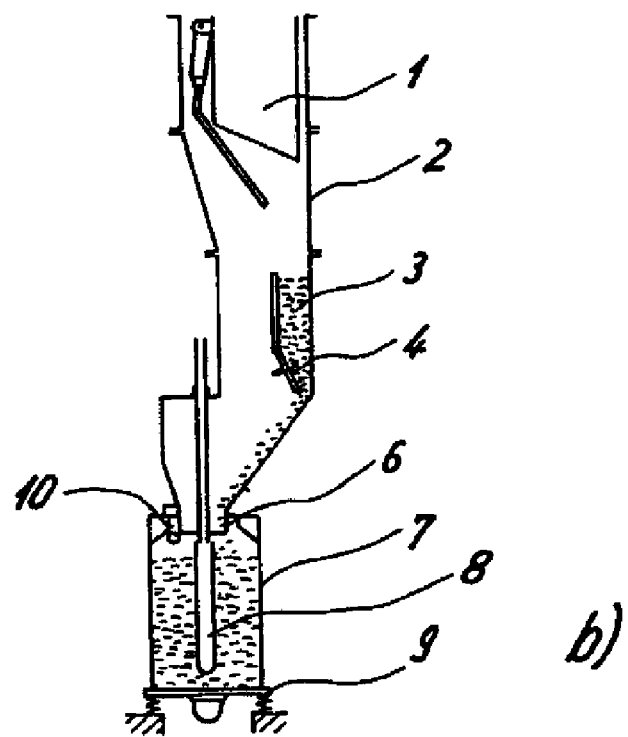

The intermediate chamber 3 may be made of individual segments, i.e. of several sub-chambers which are emptied in succession. The use of a rotary feeder as dosing device 4 has been proven as most beneficial version, with the chambers being continuously emptied via the impeller-like rotary feeder (FIGS. 1a, 1b). Rotation speed and thus metering speed can hereby be suited to the process. As an alternative, the dosing member may also be constructed in a different way (FIG. 2, showing the dosing member constructed in the form of a gate).

As the air content of the product to be filled oftentimes changes as a result of different settling times, the intermediate chamber can be configured in such a manner that its volume and/or impeller can be variably adjusted. This can be realized, e.g., by an adjustable lateral boundary wall 5 on the intermediate chamber 3.

Figure 3:
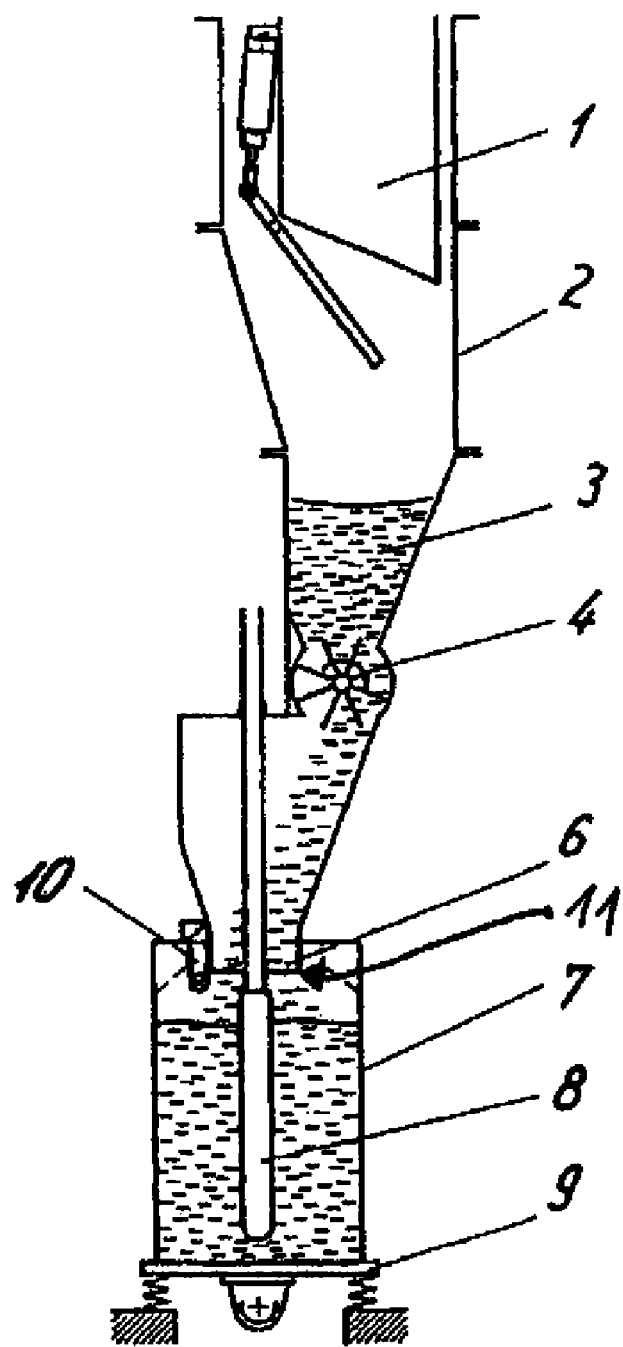
FIG. 3 shows a schematic illustration of a further apparatus for filling a container in two successive steps during filling of the container, with an intermediate chamber holding the total filling content, and a dosing member with the option of filling the container with controllable coarse stream and fine stream.

As an alternative to the apparatus FIGS. 1a, b and FIGS. 2a, b, it is also possible to construct the intermediate chamber 3 according to FIG. 3. In this arrangement, the intermediate chamber 3 extends across the entire hopper cross section of the tube/hopper arrangement 2 and thus holds the total filling amount of the material dropped from the net scale 1. Arranged at the lower end thereof is a dosing device 4 which is constructed advantageously as rotary feeder but may also be a different dosing device of known type.

The material dropped into the thus configured intermediate chamber may pass the dosing member 4 as coarse stream, when the filling process begins. The dosing member has hereby the advantageous characteristic to so limit the stream as to positively prevent bridge formation and a delay in material transfer into the container 7, as a result e.g. of a closed filling neck due to internal material friction. After the beginning rapid filling action, the dosing member 4 adjusts downwards the volume stream in dependence on the fill level in the container 7 in accordance with the parallel compaction process by means of the compaction device 8, 9 in the bag so that the container 7 cannot be overfilled during the filling operation.

A further advantage of the method resides in the fact that the dosing member 4 may be blocked for a moment—at the start of the filling process—to effect a temporary decoupling of the material drop so that an already attached container onto the neck can be sealed. Further, this method does not require a volumetric adjustment of the intermediate chamber 3 by means of e.g. an adjustable sidewall, because there is no need for the intermediate chamber to hold a defined portion of the dropped material but in general receives the entire material being dropped and the intermediate chamber 3 becomes insensitive against fluctuation in apparent density and thus volume.

As oftentimes the compaction characteristic of the product changes, it is furthermore possible to equip the installation preferably with the advantageous sensor 10 which detects the fill level of the product below the neck outlet 11. With this technique, it becomes possible to control the dosing device such that no overfilling can occur. Otherwise, provision of a safety distance would have been necessary between the product level and the neck outlet 11 which would result in a decrease of the compaction speed.

A further important fact is the transfer of the filled container 7 to a sealed stage. In order to ensure a secure closure of the container 7, a certain free space must exist above the product level to enable a reasonable engagement of the tools for sealing the bag. Also in this case, the afore-described sensor 10 provides benefits because of its ability to control the compaction process so that the presence of the required free space is ensured.

In summary, the fore-described solution ensures high productivity of the installation, compact bag dimension, high cleanliness of the bags and the installation, high security of the bag closure, and high weight accuracy.

Separation of weighing and intermediate storage provides the advantage of a simple construction of the scale as well as an increase in productivity because the next weighing process may take place during the filling operation.

Especially advantageous is the application of the installation for rotating filling machines.

What is claimed is:

1. A method for filling a container with a free-flowing product, comprising the steps of:
   diverting a first portion of a product released from a net scale into an intermediate chamber for temporarily storage, while a remaining second portion of the product is introduced via a tube/hopper arrangement into a container;
   compacting the product introduced into the container;
   metering the first portion of the product from the intermediate chamber during the compacting step concurrent with a decrease in volume of the product in the container as a result of the compacting step; and
   transferring the metered first portion of the product from the intermediate chamber into the container during the compacting step.

2. The method of claim 1, wherein the remaining portion of the product flows past the intermediate chamber and is introduced directly into the container, wherein a ratio between the first portion in the intermediate chamber and the remaining second portion of the product is so selected as to prevent overfilling of the container.

3. The method of claim 1, wherein the transferring step includes the step of metering the first portion of the product from the intermediate chamber by a dosing member during the compacting step in response to a decrease in volume of the product in the container as a result of the compacting step.

4. The method of claim 3, wherein the dosing member initially controls and regulates a high mass flow.

5. The method of claim 4, wherein the dosing member controls and regulates the mass flow such as to prevent a bridge formation in an area of a filling neck as a result of material backup.

6. The method of claim 3, wherein the dosing member controls and regulates a passing mass flow such as to prevent overfilling of the container during the compaction of the material in the container and after the second portion has been introduced into the container.

7. The method of claim 1, further comprising the step of monitoring a fill level in the container by a fill level sensor, and controlling the transferring step in dependence on the fill level.

8. The method of claim 1, further comprising the step of adjusting the compaction speed and volume flow by which the container is filled so that overfilling of the container during a filling operation is prevented.

* * * * *